Patented Sept. 10, 1946

2,407,623

UNITED STATES PATENT OFFICE 2,407,623

MODIFIED LINSEED OIL WRINKLE FINISH

William A. Waldie, Oakwood, Ohio, assignor to New Wrinkle, Inc., Dayton, Ohio, a corporation of Delaware No Drawing. Original application January 31, 1942, Serial No. 429,116. Divided and this application November 6, 1942, Serial No. 464,937

6 Claims. (Cl. 106—2)

This application is a division of copending application Serial No. 429,116, filed January 31, 1942, as a continuation-in-part of copending application Serial No. 424,010, filed December 22, 1941.

This invention relates to wrinkle varnish base, and the primary purpose thereof is the preparation of a wrinkle varnish base comprising the heat reaction product of modified drying oil, oil soluble resin and air at elevated temperature.

Hitherto the preparation of wrinkle varnish base has been considered to require the use of China-wood oil, oiticica oil and other similar drying oils containing conjugated double bonds, or mixtures of them. These oils, or mixtures, were generally used either in their raw or natural state, or subsequent to preliminary treatment as by blowing, depending on the particular characteristics required in the finished wrinkle varnish base and the nature of the individual oil or mixture of oils being used.

My copending application Serial No. 424,010 to which reference has been made hereinbefore sets forth a method whereby wrinkle varnish base can be produced by chemically combining unblown drying type oil with oil soluble resin and air at elevated temperature, the resulting product exhibiting excellent wrinkling tendency with the addition of a small amount of drier in the usual manner. My present application deals with an improved method in which chemically modified drying type oil is substituted for the unblown drying type oil (or the oil is modified in situ) and a substantial reduction is made in the cooking time for the varnish.

As typical examples of formulations and procedures according to my present invention, but without thereby limiting myself to the specific details of procedure and proportions indicated, the following illustrative examples are given:

Example I

| | | |
|---|---|---|
| Wrinkling resin | lbs | 100–125 |
| Vegetable drying oil | gallons | 10–35 |
| Polyglycerol | do | 0.5–2 |
| Hydrocarbon solvent | do | 5–10 |

In preparing the varnish base from the aforementioned components approximately one-half of the oil and all of the resin are placed in a kettle and heated rapidly to 400° F. to obtain a thorough dispersion of the resin in the oil. Of course, if it is so desired, it is possible to disperse the resin in the entire quantity of oil by following the same procedure. The polyglycerol is then added to the batch and the temperature increased to 540° F. where it is held until a uniform mixture has been obtained as evidenced by the formation of a clear spot when a drop of the mixture is dropped on glass and allowed to cool. Thereupon the batch is cooled to approximately 400 to 420° F. and blown with air until the desired or required viscosity has been obtained. A satisfactory viscosity or end-point may be considered to have been reached when a drop falls from a stirring rod with a slight thread-like filament while hot. When this condition has been reached the mixture is withdrawn from the fire and the hydrocarbon solvent added thereto. A suitable liquid drier should be added at the same time. In the case of Nuodex cobalt 6% liquid drier three-fourths to one gallon would be required for a batch such as that of Example I.

Example II

| | | |
|---|---|---|
| Amberol 801 | lbs | 100 |
| Varnish grade linseed oil | gallons | 12 |
| Polyglycerol | do | ¾ |
| Mineral spirits | do | 5 |
| Solvesso #2 | do | 16 |
| Nuodex cobalt 6% | do | ¾ |

Example III

| | | |
|---|---|---|
| Amberol F7 | lbs | 100 |
| Castung Z-3 | gallons | 12 |
| Polyglycerol | do | ¾ |
| Mineral spirits | do | 5 |
| Toluol | do | 24 |
| Nuodex cobalt 6% | do | ⅞ |

Example IV

| | | |
|---|---|---|
| Amberol F7 | lbs | 100 |
| Varnish grade linseed oil | gallons | 15 |
| Polyglycerol | do | ¾ |
| Mineral spirits | do | 5 |
| Solvesso #2 | do | 16 |
| Nuodex cobalt 6% | do | ¾ |

Example V

| | | |
|---|---|---|
| Amberol 801 | lbs | 100 |
| Varnish grade linseed oil | gallons | 12 |
| Polyglycerol | do | ⅗ |
| Mineral spirits | do | 5 |
| Solvesso #2 | do | 16 |
| Nuodex cobalt 6% | do | ¾ |

Example VI

| | | |
|---|---|---|
| Amberol 801 | lbs | 100 |
| Soya bean oil | gallons | 12 |
| Polyglycerol | do | ⅗ |
| Mineral spirits | do | 5 |
| Solvesso #2 | do | 16 |
| Nuodex cobalt 6% | do | ¾ |

Example VII

| | | |
|---|---|---|
| Amberol 801 | lbs | 100 |
| Perilla oil | gallons | 12 |
| Polyglycerol | do | 3/5 |
| Mineral spirits | do | 5 |
| Solvesso #2 | do | 16 |
| Nuodex cobalt 6% | do | 3/4 |

The procedure followed in preparing the wrinkle varnish base of my invention from the components given in Examples II to VII is substantially the same as that followed in Example I, although minor changes in temperature and time of cooking are at times advantageous depending on the nature of the oil being used.

It will be noted that in Examples I to VII the polyglycerol was incorporated in the mixture of oil and resin and cooked therein. This procedure is entirely satisfactory and economical and represents one wherein the oil is modified in situ; however, in the practice of my invention I have obtained equally satisfactory results by separately heating a mixture of drying oil and polyglycerol and using the mixture in the varnish formulation. The procedure followed was substantially as given below:

Example VIII

| | Gallons |
|---|---|
| Vegetable drying oil | 20 |
| Polyglycerol | 1 |

The above mixture was heated to a temperature of approximately 500 to 520° F. and held at substantially that temperature until a sample withdrawn from the batch did not show any substantial separation of polyglycerol and oil on cooling and until a drop deposited on glass showed complete homogeneity. The resulting product was then used in formulations such as the following:

Example IX

| | | |
|---|---|---|
| Amberol 801 | lbs | 100 |
| Product of Example VIII | gallons | 12 |
| Mineral spirits | do | 5 |
| Solvesso #2 | do | 16 |
| Nuodex cobalt 6% | do | 3/4 |

In preparing the wrinkle varnish base of my invention from the components of Example IX the resin and modified drying oil were heated together at a temperature of approximately 400° C. until the resin became thoroughly dispersed in the oil. The temperature was then increased to approximately 540° F. and held at that temperature until a clear spot formed when a drop was deposited on glass. The batch was then allowed to cool to approximately 400° F. and blown with air until the proper degree of viscosity was obtained, whereupon the drier and solvents were added to produce a coating composition possessing suitable spraying characteristics and adapted to yield a wrinkled film of uniform texture and satisfactory hardness and toughness when applied on a surface and baked.

The polyglycerol used in the various examples hereinbefore set forth was produced by treating glycerin with sodium acetate or sodium hydroxide or other suitable dehydrating agent. A typical procedure was as follows:

Example X

| | | |
|---|---|---|
| Glycerin | gallons | 4 |
| Sodium acetate | lbs | 5/8 |

The above mixture was heated slowly to 500° F. (in 30 minutes) and then allowed to cool.

As will be noted from the examples, maleic acid resin, as well as phenol-aldehyde resin, may be used satisfactorily in the practice of my invention. Maleic acid resin of the type commercially available and sold under trade names such as Amberol 801, Beckacite 1110, Beckacite 1111 and Beckacite 1114 may be employed, but, of course, other alkyd resins made from combinations of rosin, polyhydric alcohols and polycarboxylic acids or anhydrides prove suitable. Likewise, oil soluble and non-reactive phenol-aldehyde resins may be used in the practice of my invention. These include resins known by trade names such as Beckacite, Durez, Para-dura, Durite, Locto, Paranol, Varcum, etc. In every case an oil soluble and non-reactive quality must be employed.

It will be understood by those skilled in the art that by "mineral spirits" is meant that grade of petroleum product of either a paraffinic or naphthenic origin which is commonly known in the trade as turpentine substitute, while Solvesso #2 is a hydrogenated naphtha having a volatility similar to that of xylol and manufactured by Standard Oil Company. Nuodex cobalt 6% is a cobalt naphthenate drier solution in which the metallic cobalt amounts to about 6%.

The end-point of the blowing step employed in the practice of my invention may be determined as previously mentioned herein; however, it may also be determined by other means, as, for instance, by withdrawing test samples from time to time during the blowing operation, adding a predetermined amount of thinner to a definite weight of sample, and comparing the viscosity of the resulting solution with the Gardner-Holdt viscosity standards.

The fundamental difference between the method of my invention, as disclosed herein, and the method disclosed and claimed in my copending application Serial No. 424,010, filed December 22, 1941, is that according to my present improved procedure, I am able to reduce the blowing time required to produce any predetermined body by approximately one-half; therefore, the improved procedure which is the subject matter of the present invention makes it possible to effect economies in manufacture and substantially increase the output of the varnish kettles in any given plant.

The coatings produced with the wrinkle varnish base of the present invention yield hard, tough films, and since I employ unblown oils in the practice of my invention, I do not encounter the difficulties and inconveniences which characterize the use of such oils. It is well known that blown oils commonly used in the prior art exhibit auto-oxidizing tendencies due to the fact that they contain intermolecularly dispersed air which results in gradual and continuous oxidation and also leads to separation of part of the oil as an insoluble gel, thus rendering the product valueless for use in a varnish, and particularly so when the varnish is part of a sprayable composition.

In contradistinction, the product of my invention will preserve its homogeneous nature and will show no separation for an indefinite period of time. It will be noted that according to my invention the oil, as such, is not submitted to aeration and that it is the cooked varnish that is blown with air. I am unable to offer proof as to the mechanism of the reaction which the oil undergoes when treated with polyglycerol. Likewise, I am unable to offer proof as to the mechanism of the reaction which the modified oil undergoes when treated with air at elevated temperature in the presence of the synthetic resin as hereinbefore set forth. However, with respect to the latter, it is my opinion that due to the comparatively high temperature used in the blowing operation only that air which is chemically taken up by the mixture of modified oil and resin remains therein, since the temperature of treatment is sufficiently high to expel any uncombined air. This prevents the intermolecular dispersion of air which appears to be present in blown oils and leads to their continuous oxidation during storage.

It is well to reiterate that in the practice of my invention the oil, as such, is not aerated for it will be remembered that the modified oil and resin are conjointly aerated.

The selection of thinners to be used in the practice of my invention is not critical although preference should be given to those products of high volatility such as toluol, xylol, light naphtha, etc. Of course, a small quantity of low volatility solvent may prove of value to bring about a sudden chilling of a batch in order to check the bodying thereof in the event it should have been blown a trifle too long.

Many different driers may be used but preference should be given to those commonly known as "top driers" and which are characterized by a tendency to form the surface skin which is so desirable in wrinkle compositions. The resinate, linoleate and naphthenate type of drier, characterized by ready solubility, proves very suitable for this purpose.

It will be understood that while I have given typical examples using certain oils, it is not my intention to limit myself to the use of such oils in view of the fact that other drying oils are susceptible to the same treatment and may be used in the practice of my invention. The choice of oil will depend primarily on availability and cost. Those skilled in the art will understand that the Castung Z-3 used in Example III is a commercial grade of dehydrated castor oil.

The choice of resin will depend on the desired characteristics of the wrinkle varnish base. As has been noted hereinbefore, rosin modified alkyd resin such as maleic acid resin may be used satisfactorily and it will be understood that other polycarboxylic acids or their anhydrides including phthalic, tartaric, citric and malic may be substituted for the maleic acid or anhydride, although the rosin modified maleic acid resin is preferred from among the alkyd resins. Likewise, other phenol-aldehyde resins may be used in place of that mentioned in the examples.

Furthermore, natural resins such as Congo, Kauri, Batu, Zanzibar, oil soluble Manila, Pontianak, etc. may be employed, but where such resins are used they should first be "run" to make them oil soluble and the first step of the process hereinbefore described would have to be altered accordingly. In such case, for example, the resin would first be fused and then added to the heated oil and the temperature raised to a point sufficient to dissolve the resin in the oil. The necessity for pretreating the natural resin will be fully appreciated by those skilled in the art.

The products resulting from the practice of my invention are adapted for use as clear wrinkle finishes without further treatment. They may be further compounded with pigment ground in oil vehicle for the purpose of producing wrinkling enamels, and texture modifying ingredients of various sorts may be incorporated therein.

As has been mentioned hereinbefore, I am unable to give any explanation or set forth the mechanics of the reactions which take place when dehydrated glycerol or polyglycerol is reacted with the drying oil, but it is reasonable to assume that there is esterification of the oil with the formation of di-glycerides and perhaps of monoglycerides.

The most significant thing about the present invention is that I make use of oils which are plentifully available from domestic sources and which are characterized by substantial stability of quality and cost. In addition, these oils have never been considered suitable for use in the production of wrinkling varnishes without first blowing them in view of the fact that the unblown oils have always produced smooth, glossy films such as those which characterize linseed oil. It may be said, therefore, that according to my invention it is possible to produce wrinkling varnishes from unblown drying oils which hitherto have been considered unsuitable for the purpose without prior blowing thereof and which have been hitherto considered inhibitors of wrinkle formation. Therefore, the substance of my invention is that I have obtained an unexpected result contrary to the teachings and skill of the art.

Wrinkle coating compositions produced using the wrinkle varnish base of my invention are adapted to be sprayed and then baked at temperatures of from 200 to 250° F. for approximately one hour to produce a wrinkle finish characterized by its toughness and hardness.

It will be understood that while I have set forth certain specific embodiments of my invention, it is not my intention to have it limited to or circumscribed by the specific details of procedure and proportions indicated in view of the fact that my invention is adapted to changes according to individual preference and conditions without departing from the scope thereof as defined in the appended claims.

I claim:

1. The method of making wrinkle varnish base consisting in heating glycerine with a dehydrating agent from the group consisting of sodium acetate and sodium hydroxide to approximately 500° F. for about 30 minutes, adding non-conjugated double-bonded drying oil and heating to approximately 500° to 520° F.; adding natural resin and heating to approximately 540° F., and blowing the reaction mixture with air at about 400° to 420° F.

2. The method of making wrinkle varnish base consisting in heating approximately 4 gallons of glycerine with ⅝ lb. of a dehydrating agent from the group consisting of sodium acetate and sodium hydroxide to approximately 500° F. for about 30 minutes; adding per one part by volume of the mixture thus obtained 20 parts by volume of non-conjugated double-bonded drying oil and heating the mixture to approximately 500 to 520° F.; thereafter adding oil soluble natural resin and heating to approximately 540° F.; and then blowing the reaction mixture with air at about 400° to 420° F.

3. A product obtained by the process of claim 1.

4. A product obtained by the process of claim 2.

5. The method of making wrinkle varnish base consisting in heating approximately 4 gallons of glycerine with ⅝ pound of dehydrating agent from the group consisting of sodium acetate and sodium hydroxide to approximately 500° F. for about 30 minutes; adding to 0.5 to 2 gallons of the mixture thus obtained 10 to 35 gallons of non-conjugated double-bonded drying oil and heating the mixture to approximately 500 to 520° F.; thereafter adding 100 to 125 pounds of oil soluble natural resin and heating to approximately 540° F.; and then blowing the reaction mixture with air at about 400 to 420° F.

6. A product obtained by the process of claim 5.

WILLIAM A. WALDIE.